(12) United States Patent
Nagata et al.

(10) Patent No.: US 6,383,377 B2
(45) Date of Patent: May 7, 2002

(54) FILTERING APPARATUS AND OPEN/CLOSE VALVE FOR THE FILTERING APPARATUS

(75) Inventors: Osamu Nagata, Ikoma; Akira Kawaguchi, Osaka; Yasuyuki Nagata, Higashiosaka, all of (JP)

(73) Assignee: Mitaka Filter Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/756,298

(22) Filed: Jan. 9, 2001

(30) Foreign Application Priority Data

Feb. 8, 2000 (JP) ........................ 2000-030154
Dec. 18, 2000 (JP) ........................ 2000-383221

(51) Int. Cl.$^7$ ........................ B01D 37/02; B01D 35/153; B01D 35/157
(52) U.S. Cl. ........................ 210/193; 210/136; 210/777; 210/205; 210/416.1; 137/546; 137/883
(58) Field of Search ........................ 210/193, 136, 210/777, 205, 416.1; 137/883, 546

(56) References Cited

U.S. PATENT DOCUMENTS

| | | | |
|---|---|---|---|
| 38,138 A | * | 4/1863 | Bond |
| 240,755 A | * | 4/1881 | O'Meara |
| 660,356 A | * | 10/1900 | Baker |
| 845,213 A | * | 2/1907 | Bazin |
| 4,293,414 A | * | 10/1981 | Gianneli |
| 4,328,105 A | * | 5/1982 | Arbuckle |
| 4,560,483 A | * | 12/1985 | Warning et al. |
| 5,300,234 A | * | 4/1994 | Oechsle et al. |
| 5,772,867 A | * | 6/1998 | Chiang et al. |

* cited by examiner

Primary Examiner—Thomas M. Lithgow
(74) Attorney, Agent, or Firm—Rader, Fishman & Grauer, PLLC

(57) ABSTRACT

A filtering apparatus including a filtering vessel, wherein a precoat filtering layer is formed with a filter aid on a filtering bed between a nonfiltered liquid chamber where a nonfiltered liquid to be filtered is introduced and a filtered liquid chamber; a nonfiltered liquid introduction line, including a pump and a first open/close valve connected to a suction port of the pump, for introducing the nonfiltered liquid into the nonfiltered liquid chamber; a filtered liquid outlet line, including a second open/close valve, for letting out a filtered liquid through a filtered liquid outlet port of the filtered liquid chamber; a filter aid introducing line that can be opened and closed, from a precoating liquid outlet port of the filtering vessel, via a filter aid addition part, to the pump suction port; a bypass line for precoating, from the filtered liquid outlet port of the filtering vessel to the pump suction port via a third open/close valve; and a bypass line for valve cleaning, from a liquid outlet port at a bottom of a liquid inlet section of the second open/close valve of the filtered liquid outlet line, to the pump suction port via a fourth open/close valve.

6 Claims, 3 Drawing Sheets

FILTERING APPARATUS AND OPEN/CLOSE VALVE FOR THE FILTERING APPARATUS

This invention is based on Patent Application Nos. 2000-30154 Pat. and 2000-383221 Pat. filed in Japan, the contents of which are hereby incorporated by reference.

BACKGROUND OF THE INVENTION

1. Field of the Invention

The present invention relates to a filtering apparatus, especially a filtering apparatus including a filtering vessel, wherein a precoat filtering layer is formed with a filter aid on a filtering bed between a nonfiltered liquid chamber, into which a nonfiltered liquid to be filtered is introduced, and a filtered liquid chamber, so that the nonfiltered liquid introduced into the nonfiltered liquid chamber is filtered while moved through the precoat filtering layer to the filtered liquid chamber to be let out of the filtered liquid chamber.

The present invention also relates to an open/close valve for the filtering apparatus.

2. Description of the Background Art

Various processing liquids, such as a plating liquid, a dying liquid, a liquid photo developer and an ordinary cleaning liquid, are widely filtered for reuse with a filtering apparatus that includes a pump and a filtering vessel.

This is because of increases in impurities, as the liquids are repeatedly used, like impurities carried in with an article which is to be processed, impurities generated due to a change in quality like deterioration of the processing liquids and/or external impurities to fall into the liquids.

Liquid refining and filtering are also widely adopted for those such as liquid industrial chemicals, liquid pharmaceuticals and drinks.

A typical example of the above filtering apparatus is a filtering apparatus including a filtering vessel, wherein a precoat filtering layer is formed with a filter aid (filtering material) on a filtering bed between a nonfiltered liquid chamber, into which a nonfiltered liquid to be filtered is introduced, and a filtered liquid chamber, so that the nonfiltered liquid introduced into the nonfiltered liquid chamber may be filtered while moved through the precoat filtering layer to the filtered liquid chamber to be let out of the filtered liquid chamber.

FIG. 3 is an example of the conventional apparatus. The filtering apparatus in FIG. 3 is provided with a filtering vessel 8. The filtering vessel 8 includes a nonfiltered liquid chamber 83 where a nonfiltered liquid L is introduced to be filtered, a filtered liquid chamber 84 and a filtering bed 81 therebetween where a precoat filtering layer 82 is formed with a filter aid (filtering material), so that the nonfiltered liquid L, introduced, while pressurized, through a nonfiltered liquid inlet port 831 at a bottom of the nonfiltered liquid chamber 83, is filtered, while moved through the precoat filtering layer 82 to the filtered liquid chamber 84, and a filtered liquid L' is let out through a filtered liquid outlet port 841 at a bottom of the filtered liquid chamber 84.

In addition to the filtering vessel 8, the filtering apparatus 8 in FIG. 3 includes the following:
1) a nonfiltered liquid introduction pipe line 1 for introducing the nonfiltered liquid L to be filtered into the nonfiltered liquid chamber 83 through the nonfiltered liquid inlet port 831 of the nonfiltered liquid chamber, which includes a pump P, a first open/close valve (openable and closable valve) V1 connected to a suction port of the pump P and a check valve V7, located between a pump discharge port of the pump P and the nonfiltered liquid inlet port 831 of the nonfiltered liquid chamber,
2) a filtered liquid outlet pipe line 2, including a second open/close valve V2, for letting out the filtered liquid L' through the filtered liquid outlet port 841 of the filtered liquid chamber 84,
3) a bypass pipe line 3 for precoating, from the filtered liquid outlet port 841 of the filtered liquid chamber 84 to the suction port of the pump P via a third open/close valve V3, to be more detailed according to the figured example, a bypass line 3 for precoating, from a liquid flow branch point M2, located between the filtered liquid outlet port 841 of the filtering vessel 8, and the second open/close valve V2 of the filtered liquid outlet line 2, to a liquid flow confluence point M3, located between the pump suction port and the first open/close valve V1 of the nonfiltered liquid introduction line 1, via the third open/close valve V3, and
4) a filter aid introducing pipe line 5, from a prearranged precoating liquid outlet port 85 (for example, a precoating liquid outlet port arranged at the nonfiltered liquid chamber 83, or, according to the figured example, a precoating liquid outlet port prearranged on an uppermost portion of the nonfiltered liquid chamber 83) of the filtering vessel 8, to a liquid flow confluence point M1, located between the pump suction port and the first open/close valve V1 of the nonfiltered liquid introduction line 1.

The introducing line 5 is, though not limited to this, according to the figured example, a line from the precoating liquid outlet port 85 to the suction port of the pump P, via a fifth open/close valve V5, a filter aid addition part t and a sixth open/close valve V6. The filter aid (filtering material) addition part t according to the figured example is formed in a shape of a tank with an opening, for addition of the filter aid or the like, provided on an uppermost portion. A lowermost end 511 of a pipe line 51, from the precoating liquid outlet port 85 of the filtering vessel 8 to the filter aid addition part t via the fifth open/close valve V5, is inserted and opened into the tank t. A liquid outlet port at a bottom of the tank t is connected to the liquid flow confluence point M1, located just before the suction port of the pump, with a pipe 52 having the sixth open/close valve V6 therebetween.

PG in the figure is a pressure gauge to measure a pressure in the filtering vessel 8.

When the filtering apparatus is in normal liquid filtering operation, only the valves V1 and V2 are opened with all the other open/close valves closed out of a plural number of open/close valves. Under the condition, the pump P is put in operation. The nonfiltered liquid L to be filtered is sucked into the pump P through the valve V1 and is discharged from the pump P to flow into the nonfiltered liquid chamber 83 through the check valve V7. The nonfiltered liquid L in the nonfiltered liquid chamber 83 flows into the filtered liquid chamber 84 under a discharging pressure of the pump through the precoat filtering layer 82 formed beforehand with the filter aid. At this time, the nonfiltered liquid is filtered. The filtered liquid L' flows to a predetermined location (not shown) out of the filtered liquid outlet port 841 of the filtered liquid chamber 84 and through the open/close valve V2.

The liquid in the filtering vessel 8 starts to flow back to the pump P when filtering operation is ended with stoppage of the pump P or when the pump is stopped due to an electric power outage. The flow, however, is stopped by the check valve V7, so that the liquid in the filtering vessel 8 stays in the vessel.

The precoat filtering layer 82 is formed, for example, in such a manner as follows:

The open/close valve V2 of the filtered liquid outlet line 2, the open/close valve V3 of the bypass line 3 for precoating and the sixth open/close valve V6 of the line 5 are closed, when the filtering vessel 8 is free from any liquid inside as immediately after installation of the filtering apparatus, or is cleaned and free from any liquid. On the other hand, the open/close valve V1 of the nonfiltered liquid introduction line 1 and the fifth open/close valve V5 of the line 5 are opened. Under this condition, the pump P is started, when prime water W is introduced into the filter aid addition tank t and the valve V6 is opened.

The pump P, while sucking the prime water W, begins to suck the nonfiltered liquid L. The nonfiltered liquid is thus introduced into the filtering vessel 8 this way, letting out air in the filtering vessel 8 through the precoating liquid outlet port 85 and also from the pipe 51. The filtering vessel is filled with the liquid in this manner.

The liquid in the filtering vessel thus starts to flow out of the precoating liquid outlet port 85 on the uppermost portion of the filtering vessel and comes down to the tank t, which is ensured by an operating personnel to know that the filtering vessel 8 is filed with a predetermined quantity of liquid.

Prime water is kept introduced, to prevent air from being sucked to the pump, until the tank t is supplied with the liquid through the precoating liquid outlet port 85.

When the filtering vessel 8 is filled with the predetermined quantity of liquid, with the pump P still in operation, the open/close valve V3, of the bypass line 3 for precoating, is opened, the open/close valve V1, of the liquid introduction line 1, is closed and then the filter aid (filtering material) F is added into the filter aid addition tank t. Air, sucked into the filtering vessel 8 when the filter aid F is added, is purged from the valve V5 and also from the pipe 51. Upon completion of addition of the filter aid F and purging of air in the filtering vessel 8, the valves V5 and V6 are closed.

The liquid is circulated from the pump P to the nonfiltered liquid chamber 83 of the filtering vessel, the filtered liquid chamber 84, the bypass line 3 for precoating and back to the pump P. During circulation, the filter aid F is deposited on the filtering bed 81 to form the predetermined precoat filtering layer 82.

After forming the precoat filtering layer 82, normal filtering operation is possible, by opening the valve V1 of the liquid introduction line 1 and then opening the valve V2 of the liquid outlet line 2 with the valve V3 of the bypass line 3 closed.

In operation of the filtering apparatus, such problems may occur as shown below, when normal operation is started on a day after shutting down the pump on the previous day for ending a scheduled period of operation, scheduled daily operation for example.

The precoat filtering layer 82 may be damaged due to partial detachment of the filter aid from the precoat filtering layer caused by a pressure drop in the nonfiltered liquid chamber at the time of pump shutdown. Or, the precoat filtering layer 82 may be damaged due to partial detachment of the filter aid from the precoat filtering layer 82 caused by mixing or stirring, at the time of pump restarting, of air sucked from a pump axial seal portion or the like during previous filtering operation to stay in the uppermost portion of the filtering vessel 8.

For purposes including reinstatement of thus damaged precoat filtering layer, the filter aid that may, for example, be floating or have settled down in the nonfilterd liquid chamber 83 is again made to attach to or settle down on the filtering bed 81 beforehand, using the line 5 and the bypass line 3 for precoating, as described above without further addition of the filter aid or with further addition of the same on an required basis.

A conventional filtering apparatus such as the one above, however, has a problem below.

For forming the precoat filtering layer 82, the open/close valve V3, of the bypass line 3 for precoating, is opened to circulate the liquid through the filtering vessel 8, so, at an initial stage of precoat filtering layer formation, the filter aid and part of sludge in the nonfiltered liquid chamber leak from the nonfiltered liquid chamber 83 to the filtered liquid chamber 84, and come from the filtered liquid chamber 84 to a liquid inlet section of the open/close valve V2, via the liquid flow branch point M2 of the liquid outlet line 2, and stay in the liquid inlet section of the valve V2 and also in the line thereto Because of this, the filter aid, particularly a fine filter aid, sludge in the liquid and the like that have passed through the filtering bed while the filtering bed 81 is not fully precoated, stay and/or settle down in an area like the liquid inlet section of the valve and in the line thereto. Sludge and/or the filter aid among other things that have thus stayed and/or settled down come floating in the filtered liquid that should be clean, during normal operation for filtering the nonfiltered liquid after precoat filtering layer formation is completed.

A defective product, therefore, tends to be made in product processing with the filtered liquid like plating due to sludge and/or the like above attached to the processed product. Also, it is difficult to obtain a liquid refined to a desired level for liquid industrial chemicals, liquid pharmaceuticals, drinks or the like.

In addition to the above, problems below are also observed.

The filtering vessel 8 is usually installed on a pedestal located on a higher elevation than a floor of the filtering apparatus for consideration of piping and the like. The check valve V7, along the pipe between the pump P outlet port and the nonfiltered liquid inlet port 831, is in a vertical position with the liquid inlet port down and the outlet up, which makes the pedestal considerably tall giving a personnel working there risk the more.

Furthermore, when the pump P is shutdown, a partially detached filter aid and the like from the precoat filtering layer 82, coming back to the check valve, tend to cause malfunctioning of the check valve V7.

SUMMARY OF THE INVENTION

An object of the invention is to provide a filtering apparatus, including a filtering vessel, where a precoat filtering layer is formed with a filter aid (filtering material) on a filtering bed between a nonfiltered liquid chamber, into which a nonfiltered liquid to be filtered is introduced with a pump, and a filtered liquid chamber, so that the nonfiltered liquid introduced into the nonfiltered liquid chamber is filtered while moved through the precoat filtering layer to the filtered liquid chamber to be let out of the filtered liquid chamber and also including a line for precoating the filtering bed with the filter aid using the nonfiltered liquid, wherein staying of sludge, part of the filter aid and the like in the nonfiltered liquid used for precoating is suppressed in a line for letting the filtered liquid out of the filtered liquid chamber and so, the more cleanly filtered liquid is obtained during normal filtering operation after the precoat filtering layer is formed.

Another object of the invention is to provide the above filtering apparatus, wherein a pedestal is made shorter in height, if the filtering vessel is located on the pedestal, to make work on the pedestal the safer, and part of the filter aid and/or the like detached from the precoat filtering layer, at the time of pump shutdown, do not easily come back to a check valve installed along a line for introduction of the nonfiltered liquid to the nonfiltered liquid chamber of the filtering vessel, and, therefore, ill-effect on the check valve and furthermore an upstream pump axial seal portion by the detached filter aid and the like is suppressed and so proper and effective filtering operation is maintained for a long time.

Still another object of the invention is to provide an open/close (openable and closable) valve, for the filtering apparatus including the above mentioned filtering vessel and the line for precoating the filtering bed, which is to be installed along the line to let the filtered liquid out of the filtered liquid chamber and able to suppress staying of sludge, part of the filter aid and the like in the nonfiltered liquid used for precoating, in the line for letting the filtered liquid out of the filtered liquid chamber so that the more cleanly filtered liquid is obtained during normal filtering operation after the precoat filtering layer is formed.

The invention provides a filtering apparatus and an open/close (openable and closable) valve for the apparatus as described below.

(1) Filtering Apparatus

A filtering apparatus comprising:

a filtering vessel, wherein a precoat filtering layer is formed with a filter aid (filtering material) on a filtering bed between a nonfiltered liquid chamber having a nonfiltered liquid inlet port, through which a nonfiltered liquid to be filtered is introduced, and a filtered liquid chamber having a filtered liquid outlet port, so that the nonfiltered liquid introduced through said nonfiltered liquid inlet port into the nonfiltered liquid chamber is filtered while moved through said precoat filtering layer to said filtered liquid chamber to be let out of said filtered liquid chamber through the filtered liquid outlet port;

a nonfiltered liquid introduction line, including a pump and a first open/close valve connected to a suction port of said pump, for introducing the nonfiltered liquid to be filtered into said nonfiltered liquid chamber through said nonfiltered liquid inlet port;

a filtered liquid outlet line, including a second open/close valve, for letting out the filtered liquid through the filtered liquid outlet port of said filtered liquid chamber;

a filter aid introducing line that can be opened and closed, including a filter aid addition part, from a prearranged precoating liquid outlet port of said filtering vessel, to a portion between the pump suction port and the first open/close valve of said nonfiltered liquid introduction line;

a bypass line for precoating, from a portion between said filtered liquid outlet port and the second open/close valve of said filtered liquid outlet line, to a portion between the pump suction port and the first open/close valve of said nonfiltered liquid introduction line, via a third open/close valve; and a bypass line for valve cleaning, from a liquid inlet section of the second open/close valve of said filtered liquid outlet line, to a portion between the pump suction port and the first open/close valve of said nonfiltered liquid introduction line, via a fourth open/close valve.

(2) Open/Close Valve for Filtering Apparatus

An open/close valve for a filtering apparatus including a filtering vessel, wherein a precoat filtering layer is formed with a filter aid (filtering material) on a filtering bed between a nonfiltered liquid chamber having a nonfiltered liquid inlet port, through which a nonfiltered liquid to be filtered is introduced, and a filtered liquid chamber having a filtered liquid outlet port, so that the nonfiltered liquid introduced through said nonfiltered liquid inlet port into the nonfiltered liquid chamber is filtered while moved through said precoat filtering layer to said filtered liquid chamber to be let out of said filtered liquid chamber through the filtered liquid outlet port; a nonfiltered liquid introduction line, including a pump and a first open/close valve connected to a suction port of said pump, for introducing the nonfiltered liquid to be filtered into said nonfiltered liquid chamber through said nonfiltered liquid inlet port; a filtered liquid outlet line, including a second open/close valve, for letting out the filtered liquid through the filtered liquid outlet port of said filtered liquid chamber; a filter aid introducing line that can be opened and closed including a filter aid addition part, from a prearranged precoating liquid outlet port of said filtering vessel, to a portion between the pump suction port and the first open/close valve of said nonfiltered liquid introduction line; and a bypass line for precoating, from a portion between the filtered liquid outlet port and the second open/close valve of said filtered liquid outlet line, to a portion between the pump suction port and the first open/close valve of said nonfiltered liquid introduction line, via a third open/close valve; wherein said open/close valve for the filtering apparatus is a valve used as said second open/close valve in said filtered liquid outlet line, and has a liquid outlet port at a bottom of a liquid inlet section of the valve to let out, with the liquid, impurities in the liquid inlet section.

The open/close valve according to the invention and the open/close valve in the filtering apparatus according to the invention, e. g., the second open/close valve of the filtered liquid outlet line may be of various types, so long as opened or closed. Various types of manual valves and/or automatic valves can be employed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
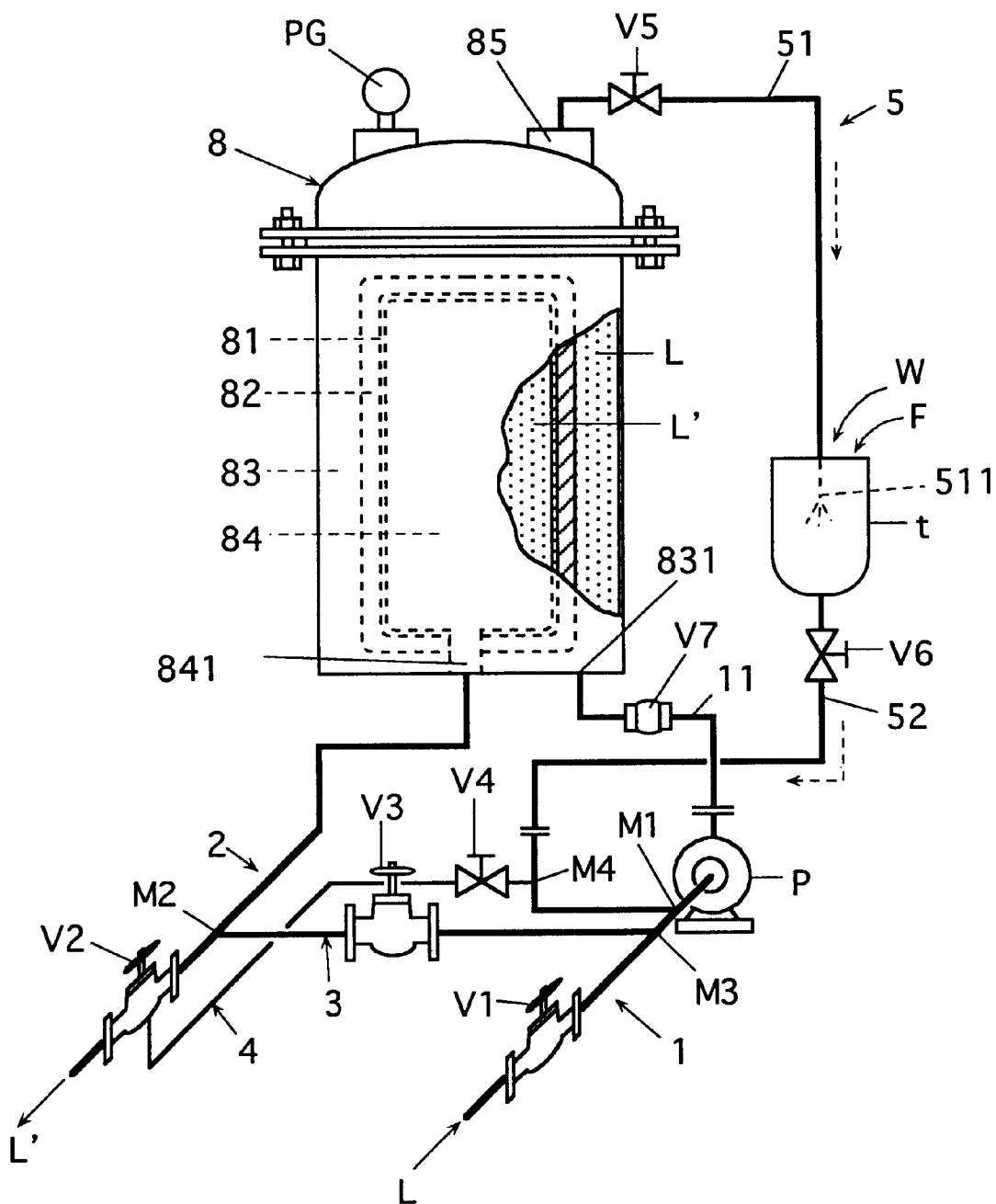
FIG. 1 is a schematic perspective view of an example of the filtering apparatus according to the invention.

A preferred embodiment of the filtering apparatus according to the invention includes a filtering vessel, a line for introducing a nonfiltered liquid to be filtered to the filtering vessel, a line for letting out a filtered liquid from the filtering vessel, a filter aid introducing line, a bypass line for precoating and a bypass line for valve cleaning.

The filtering vessel is a filtering vessel, wherein a precoat filtering layer is formed with a filter aid (filtering material) on a filtering bed between a nonfiltered liquid chamber having a nonfiltered liquid inlet port through which the nonfiltered liquid to be filtered is introduced, and a filtered liquid chamber having a filtered liquid outlet port, so that the nonfiltered liquid introduced into the nonfiltered liquid chamber through the nonfiltered liquid inlet port may be filtered while moved through the precoat filtering layer to the filtered liquid chamber and the filtered liquid may be let out through the filtered liquid outlet port of the filtered liquid chamber.

The nonfiltered liquid introduction line is for introducing the nonfiltered liquid to be filtered into the nonfiltered liquid chamber through the nonfiltered liquid inlet port and includes a pump and a first open/close (openable and closable) valve connected to a suction port of the pump.

The filtered liquid outlet line is for letting out the filtered liquid through the filtered liquid outlet port of the filtered liquid chamber and includes a second open/close valve.

The filter aid (filtering material) introducing line is a line that can be opened and closed, from a prearranged precoating liquid outlet port of the filtering vessel, to a portion between the pump suction port and the first open/close valve of the nonfiltered liquid introduction line, including a filter aid addition part.

The bypass line for precoating is a line from a portion between the filtered liquid outlet port of the filtered liquid chamber and the second open/close valve of the filtered liquid outlet line, to a portion between the pump suction port and the first open/close valve of the nonfiltered liquid introduction line, via a third open/close valve.

The bypass line for valve cleaning is a line from a liquid inlet section of the second open/close valve of the filtered liquid outlet line, to a portion between the pump suction port and the first open/close valve of the nonfiltered liquid introduction line, via a fourth open/close valve.

When the filtering apparatus is in normal liquid filtering operation, only the first open/close valve, of the nonfiltered liquid introduction line, and the second open/close valve, of the filtered liquid outlet line, are opened with all the other open/close valves closed out of a plural number of open/close valves. Under the condition, the pump is put in operation.

The nonfiltered liquid to be filtered is sucked into the pump through the first open/close valve and is discharged from the pump to flow into the nonfiltered liquid chamber of the vessel. The nonfiltered liquid in the nonfiltered liquid chamber flows into the filtered liquid chamber under the discharging pressure of the pump through the precoat filtering layer formed beforehand with the filter aid. At this time, the nonfiltered liquid is filtered. The filtered liquid flows to a predetermined location (not shown) out of the filtered liquid outlet port of the filtered liquid chamber and through the second open/close valve of the filtered liquid outlet line.

The precoat filtering layer is formed, for example, in such a manner as follows:

The second open/close valve of the filtered liquid outlet line and the third open/close valve of the bypass line for precoating are closed, when the filtering vessel is free from any liquid inside as immediately after installation of the filtering apparatus, or is cleaned and free from any liquid. On the other hand, the first open/close valve of the nonfiltered liquid introduction line and the precoating liquid outlet port of the filtering vessel are opened. Prime water is introduced from the filter aid addition part of the filter aid introducing line.

The filter aid introducing line can for example be the line from the prearranged precoating liquid outlet port of the filtering vessel (for example, the precoating liquid outlet port arranged on the uppermost portion of the nonfiltered liquid chamber of the filtering vessel), to the portion between the pump suction port and the first open/close valve of the nonfiltered liquid introduction line, via the filter aid addition part.

The filter aid addition part can, for example, be formed in a shape of a tank with an opening, for addition of the filter aid or the like, provided on the uppermost portion. A pipe line may be arranged from the precoating liquid outlet port of the filtering vessel to the filter aid addition part via an open/close valve, with the lowermost end of the pipe line inserted and opened into the tank. The liquid outlet port at the bottom of the tank may be connected to the portion between the pump suction port and the first open/close valve of the nonfiltered liquid introduction line, with a pipe having an open/close valve half way along the pipe itself.

With prime water already introduced, the pump is started.

The pump, while sucking the prime water, begins to suck the nonfiltered liquid. The liquid is thus introduced into the filtering vessel and the vessel is filled with the liquid. The liquid in the filtering vessel starts to flow out of the precoating liquid outlet port of the filtering vessel and to come down to the filter aid addition part, which is ensured by an operating personnel to know that the filtering vessel is filed with a predetermined quantity of liquid.

Prime water is kept introduced, to prevent air from being sucked to the pump, until the filter aid addition part is supplied with the liquid through the precoating liquid outlet port of the vessel.

When the filtering vessel is filled with the predetermined quantity of liquid, with the pump still in operation, the third open/close valve of the bypass line for precoating is opened, the first open/close valve of the liquid introduction line is closed and then the filter aid (filtering material) is added into the filter aid addition part of the introducing line. Upon completion of addition of the filter aid, the introducing line is closed.

The liquid is circulated from the pump to the nonfiltered liquid chamber of the filtering vessel, the filtered liquid chamber, the bypass line for precoating and back to the pump. During circulation, the filter aid builds up on the filtering bed to form the predetermined precoat filtering layer.

For forming the precoat filtering layer, the nonfiltered liquid including sludge is introduced into the filtering vessel and, upon completion of adding the filter aid, the liquid is circulated while the third open/close valve of the bypass line for precoating is opened, and then part of the nonfiltered liquid comes to the second open/close valve of the filtered liquid outlet line for letting out the filtered liquid, and tends to stay in the liquid inlet section of the valve and also in the line thereto.

In the filtering apparatus described here, however, the bypass line for valve cleaning is provided. By opening the fourth open/close valve of the line at an initial stage of precoat filtering layer formation, or, at the latest, before completion of formation of the precoat filtering layer, impurities (sludge and/or a filter aid, particularly a fine filter aid particle, that have passed through the filtering bed while the filtering bed is not fully precoated) in the liquid coming into the liquid inlet section of the second open/close valve can be sucked to the pump. By so doing, it is possible to suppress staying of the nonfiltered liquid, therefore, staying and/or settling down of the filter aid, sludge and/or the like, along the line from the filtered liquid outlet port of the filtered liquid chamber to the liquid inlet section of the second open/dose valve and also in the liquid inlet section of the second open/close valve. The more cleanly filtered liquid, therefore, is obtained during normal filtering operation after the precoat filtering layer is formed.

In operation of the filtering apparatus, such problems may occur as shown below. After shutting down the pump for ending a scheduled period of operation, scheduled daily operation for example, the precoat filtering layer may be damaged due to partial detachment of the filter aid from the precoat filtering layer caused by a pressure drop in the nonfiltered liquid chamber.

When normal operation is restarted next time (on the following day for example), the precoat filtering layer may be damaged due to partial detachment of the filter aid from the precoat filtering layer caused by mixing or stirring, at the time of pump restarting, of air sucked from the pump axial seal portion or the like during previous filtering operation to stay in the uppermost portion of the filtering vessel.

For purposes including reinstatement of thus damaged precoat filtering layer, the filter aid that may, for example, be floating or have settled down in the nonfilterd liquid chamber can again be made to attach to or settle down on the filtering bed beforehand, using the line for precoating and/or the like, as described above without further addition of the filter aid or with further addition of the same on an as-required basis.

The liquid in the filtering vessel starts to flow back to the pump when filtering operation is ended with stoppage of the pump or when the pump is stopped due to an electric power outage. This can, however, be prevented from happening by, for example, providing the check valve between the pump discharge port and the nonfiltered liquid inlet port of the nonfiltered liquid chamber. It is preferable to install the check valve, if installed, in a horizontal or almost horizontal position along a horizontal or almost horizontal portion of the pipe to make shorter in height.

Installation of the check valve in such a manner makes a check valve portion shorter in height as compared with the same installed in a vertical position. If the filtering vessel is installed on a pedestal, the pedestal can, therefore, be made the shorter in height and safety can the more be ensured for a personnel working on the pedestal.

The check valve prevents the liquid in the nonfiltered liquid chamber of the filtering vessel from flowing back to the pump, when filtering operation is ended with stoppage of the pump or when the pump is stopped due to an electric power outage. Also, the check valve is installed in a horizontal or almost horizontal position along the horizontal or almost horizontal portion of the pipe, so, for the filter aid of the precoat filtering layer that may be detached at the time of pump shutdown, part of that which has settled down in the filtering vessel and/or the like to come back to the check valve to cause malfunction of the valve or to the pump axial seal portion to cause wear of the potion is suppressed. Efficient filtering operation, therefore, is possible for a long time.

A preferred embodiment of an open/close valve (openable and closable) for a filtering apparatus according to the invention is an open/close valve for the filtering apparatus, used as the second open/close valve in the filtered liquid outlet line of the filtering apparatus.

The open/close valve for the filtering apparatus has a liquid outlet port at a bottom of a liquid inlet section to let out, with the liquid, impurities to stay in the liquid inlet section.

The open/close valve for the filtering apparatus, by opening the liquid outlet port of the liquid inlet section, can let out the nonfiltered liquid for precoating that may stay in the liquid inlet section of the valve and/or in the line thereto, with sludge, the filter aid and the like contained in the nonfiltered liquid. The open/close valve can be used as the second open/close valve in the filtered liquid outlet line of the filtering apparatus.

The filtering apparatus and the second open/close valve for the filtering apparatus are described below with reference to the drawings.

FIG. 1 is an example of the filtering apparatus. The filtering apparatus is an improvement on a conventional filtering apparatus shown in FIG. 3. The filtering apparatus shown in FIG. 1 includes an example of the open/close valve according to the invention (open/close valve V2 shown in FIG. 2, to be described later).

In the filtering apparatus shown in FIG. 1, the bypass line 4 for valve cleaning is added, starting from the liquid inlet section 91 (See FIG. 2.) of the second open/close valve V2 of the nonfiltered liquid outlet line 2 and connected to the suction port of the pump P, via the fourth open/close valve V4 and through the liquid flow confluence point M4 halfway along the pipe 52 of the line 5. A portion from the valve V2 to the pipe 52 of the line 4 is of the same as or smaller than the pipe 52 in diameter. The portion from the valve V2 to the pipe 52 of the line 4 is of smaller diameter than any of the pipe for the line 1, 2 or 3.

The check valve V7 is connected sideways in a horizontal or almost horizontal position half way along the pipe 11 that comes down vertically from the nonfiltered liquid inlet port 831 of the nonfiltered liquid chamber 83 of the filtering vessel and then extends horizontally or almost horizontally.

Figure 3:
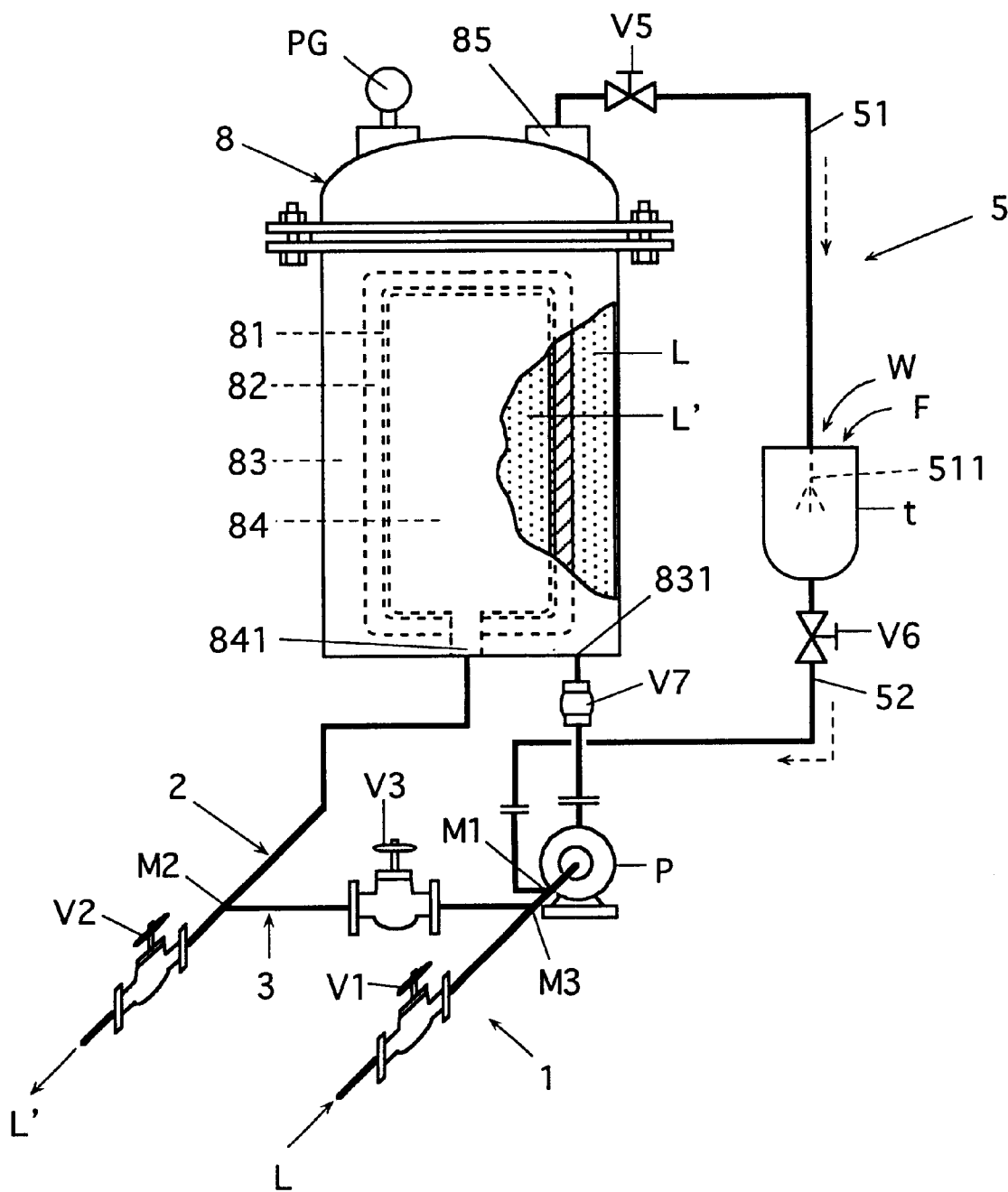
FIG. 3 is a schematic perspective view of a conventional filtering apparatus.

The filtering apparatus is identical with the one shown in FIG. 3, with the exception of those above. Those that have the same structures and functions as the parts of the filtering apparatus in FIG. 3 are provided with same reference symbols as FIG. 3.

Normal liquid filtering operation is performed and the precoat filtering layer is formed in the filtering apparatus in FIG. 1, as in the conventional filtering apparatus shown in FIG. 3. This aspect, therefore, is not to be described. The valve V4 of the bypass line 4 for valve cleaning is closed for normal liquid filtering operation.

Improved points are described. The bypass line 4 for valve cleaning is provided in the filtering apparatus shown in FIG. 1. For forming the precoat filtering layer 82, by opening the fourth open/close valve V4 of the line 4 at the initial stage of precoat filtering layer formation, or, at the latest, before completion of formation of the precoat filtering layer, the liquid that has come into the liquid inlet section 91 of the second open/close valve V2 can be sucked to the pump P. By so doing, it is possible to suppress staying of the nonfiltered liquid, therefore, staying and/or settling down of sludge, part of the filter aid and/or the like, along the line from the filtered liquid outlet port 841 of the filtered liquid chamber 84 to the liquid inlet section 91 of the second open/close valve V2 and also in the liquid inlet section 91 of the second open/close valve V2.

The more cleanly filtered liquid L', therefore, is obtained during normal filtering operation after the precoat filtering layer is formed.

Figure 2:
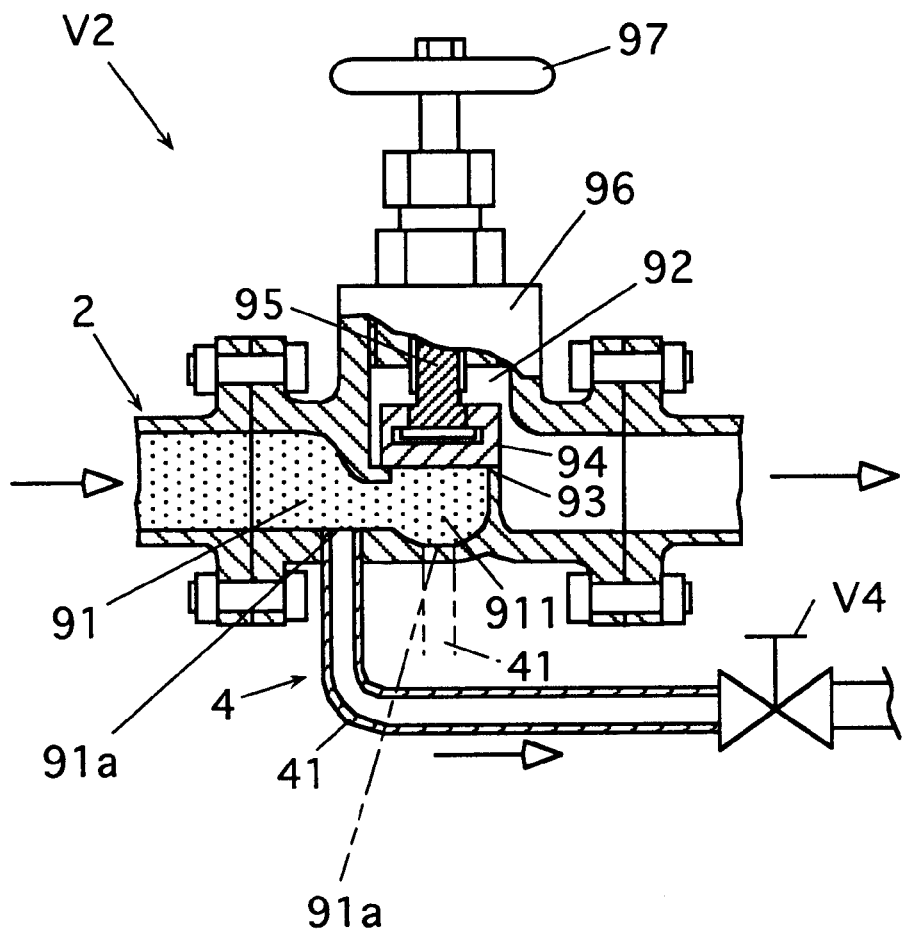
FIG. 2 is an enlarged cross-sectional view of part of the filtered liquid outlet line.

FIG. 2 shows the open/close valve V2 and adjacent sections in an enlarged manner. The valve V2 is an open/close valve having a liquid outlet section up above and the liquid inlet section down below with a valve seat therebetween where a valve body can be in or out of contact. As shown in FIG. 2, the valve V2 has the liquid inlet section 91, the liquid outlet section 92, the valve seat 93 located therebetween, the vertically movable valve body 94 that can contact the valve seat in a liquid leak tight manner, a valve spindle 95 to support the valve body, fitted to a valve casing 96 in a vertically movable manner by a thread (screw) mechanism and a valve handle 97 at an upper end of the spindle 95.

A pipe 41 to form the bypass line 4 for valve cleaning is connected to a liquid outlet port 91a located at a bottom of the liquid inlet section 91. According to the example shown in the FIG. 2, the pipe 41 is connected to a location comparatively near the liquid inlet port of the liquid inlet section 91. If no inconvenience is observed, the liquid outlet port 91a may be formed at a bottom of the most downward-bulged portion of the liquid inlet section, so that the pipe may be connected there. To show an example with reference to FIG. 2, the liquid outlet port 91a may be formed at the bottom of the most downward-bulged portion 911 directly under the valve body 94.

As described above, the check valve V7 is connected to a horizontal or almost horizontal portion of the pipe 11 in a horizontal or almost horizontal position. The check valve portion, therefore, is shorter in height as compared with the same installed in a vertical position. If the filtering vessel 8 is installed on a pedestal, which is not shown, the pedestal can, therefore, be made the shorter in height and safety can the more be ensured for a personnel working on the pedestal.

The check valve V7 prevents the liquid L in the nonfiltered liquid chamber of the filtering vessel from flowing back to the pump P, when filtering operation is ended with stoppage of the pump P or when the pump P is stopped due to an electric power outage. Also, the check valve V7 is installed in a horizontal or almost horizontal position along the pipe 11, so, for the filter aid that may be detached from the precoat filtering layer 82 at the time of pump shutdown, part of that which has settled down in the filtering vessel 8 and/or the like to come back to the check valve V7 to cause malfunction of the valve or to the pump axial seal portion to cause wear of the potion is suppressed. Efficient filtering operation, therefore, is possible for a long time Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A filtering apparatus comprising:
    a filtering vessel, wherein a precoat filtering layer is formed with a filter aid on a filtering bed between a nonfiltered liquid chamber having a nonfiltered liquid inlet port, through which a nonfiltered liquid to be filtered is introduced, and a filtered liquid chamber having a filtered liquid outlet port, so that the nonfiltered liquid introduced through said nonfiltered liquid inlet port into the nonfiltered liquid chamber is filtered while moved through said precoat filtering layer to said filtered liquid chamber to be let out of said filtered liquid chamber through the filtered liquid outlet port;
    a nonfiltered liquid introduction line, including a pump and a first open/close valve connected to a suction port of said pump, for introducing the nonfiltered liquid to be filtered into said nonfiltered liquid chamber through said nonfiltered liquid inlet port;
    a filtered liquid outlet line, including a second open/close valve, for letting out the filtered liquid through the filtered liquid outlet port of said filtered liquid chamber;
    a filter aid introducing line that can be opened and closed, including a filter aid addition part, from a prearranged precoating liquid outlet port of said filtering vessel, to a portion between the pump suction port and the first open/close valve of said nonfiltered liquid introduction line;
    a bypass line for precoating, from a portion between said filtered liquid outlet port and the second open/close valve of said filtered liquid outlet line, to a portion between the pump suction port and the first open/close valve of said nonfiltered liquid introduction line, via a third open/close valve; and
    a bypass line for valve cleaning, from a liquid inlet section of the second open/close valve of said filtered liquid outlet line, to a portion between the pump suction port and the first open/close valve of said nonfiltered liquid introduction line, via a fourth open/close valve.

2. The filtering apparatus according to claim 1, wherein said nonfiltered liquid introduction line has a check valve between a liquid outlet port of said pump and the nonfiltered liquid inlet port of said nonfiltered liquid chamber.

3. The filtering apparatus according to claim 2, wherein said check valve is installed along a horizontal or almost horizontal pipe portion in a horizontal or almost horizontal position to be short in height.

4. The filtering apparatus according to claim 1, 2 or 3, wherein said second open/close valve is an open/close valve having a liquid outlet section up above and said liquid inlet section down below with a valve seat therebetween where a valve body can be in or out of contact, a liquid outlet port is formed at a bottom of the most downward-bulged portion of said liquid inlet section and said bypass line for valve cleaning is connected to said liquid outlet port of the liquid inlet section.

5. A filtering apparatus including a filtering vessel, wherein a precoat filtering layer is formed with a filter aid on a filtering bed between a nonfiltered liquid chamber having a nonfiltered liquid inlet port, through which a nonfiltered liquid to be filtered is introduced, and a filtered liquid chamber having a filtered liquid outlet port, so that the nonfiltered liquid introduced through said nonfiltered liquid inlet port into the nonfiltered liquid chamber is filtered while moved through said precoat filtering layer to said filtered liquid chamber to be let out of said filtered liquid chamber through the filtered liquid outlet port; a nonfiltered liquid introduction line, including a pump and a first open/close valve connected to a suction port of said pump, for introducing the nonfiltered liquid to be filtered into said nonfiltered liquid chamber through said nonfiltered liquid inlet port; a filtered liquid outlet line, including a second open/close valve, for letting out the filtered liquid through the filtered liquid outlet port of said filtered liquid chamber; a filter aid introducing line that can be opened and closed including a filter aid addition part, from a prearranged precoating liquid outlet port of said filtering vessel, to a portion between the pump suction port and the first open/close valve of said nonfiltered liquid introduction line; and a bypass line for precoating, from a portion between the filtered liquid outlet port and the second open/close valve of said filtered liquid outlet line, to a portion between the pump suction port and the first open/close valve of said nonfiltered liquid introduction line, via a third open/close valve; wherein
    said second open/close valve is in said filtered liquid outlet line, and has a liquid outlet port at a bottom of a liquid inlet section of the valve to let out, with the liquid, impurities in the liquid inlet section.

6. The filtering apparatus according to claim 5, wherein the second open/close valve has a liquid outlet section up above and said liquid inlet section down below with a valve seat therebetween where a valve body can be in or out of contact, and said liquid outlet port is formed at the bottom of the most downward-bulged portion of said liquid inlet section.

* * * * *